(12) United States Patent
Mansur et al.

(10) Patent No.: US 9,547,672 B2
(45) Date of Patent: Jan. 17, 2017

(54) ZERO-OUTAGE DATABASE REORGANIZATION

(71) Applicant: BMC Software, Inc., Houston, TX (US)

(72) Inventors: Bruce H. Mansur, Dripping Springs, TX (US); Sudipta Sengupta, Houston, TX (US); Gary L. Salazar, Richmond, TX (US)

(73) Assignee: BMC Software, Inc., Houston, TX (US)

( * ) Notice: Subject to any disclaimer, the term of this patent is extended or adjusted under 35 U.S.C. 154(b) by 819 days.

(21) Appl. No.: 13/625,257

(22) Filed: Sep. 24, 2012

(65) Prior Publication Data

US 2014/0089253 A1 Mar. 27, 2014

(51) Int. Cl.
*G06F 17/30* (2006.01)

(52) U.S. Cl.
CPC .................. *G06F 17/303* (2013.01)

(58) Field of Classification Search
None
See application file for complete search history.

(56) References Cited

U.S. PATENT DOCUMENTS

| | | | | |
|---|---|---|---|---|
| 5,625,815 A * | 4/1997 | Maier | ............... | G06F 17/30595 |
| 5,936,624 A * | 8/1999 | Lisle et al. | ..................... | 715/835 |
| 7,158,985 B1 * | 1/2007 | Liskov | ............... | G06F 11/2097 |
| 7,284,109 B1 * | 10/2007 | Paxie | ............... | G06F 17/30067 |
| | | | | 711/173 |
| 7,568,080 B2 * | 7/2009 | Prahlad et al. | ............... | 711/162 |
| 7,747,562 B2 * | 6/2010 | Gould | ............... | G06F 17/30592 |
| | | | | 707/602 |
| 7,747,996 B1 * | 6/2010 | Dice | ..................... | G06F 9/526 |
| | | | | 710/200 |
| 7,809,762 B1 * | 10/2010 | Parker et al. | ................. | 707/802 |
| 8,171,005 B2 | 5/2012 | Mansur et al. | | |
| 8,825,601 B2 * | 9/2014 | Huynh Huu | ............ | G06F 17/30 |
| | | | | 707/646 |
| 2003/0135478 A1 * | 7/2003 | Marshall et al. | .................. | 707/1 |
| 2004/0123048 A1 * | 6/2004 | Mullins | ............... | G06F 12/0815 |
| | | | | 711/141 |
| 2005/0102331 A1 * | 5/2005 | Bracey | .................. | G06F 12/023 |
| 2005/0240638 A1 * | 10/2005 | Fisher | .............. | G06F 17/30339 |
| 2005/0289169 A1 * | 12/2005 | Adya | .................. | G06F 11/1482 |
| 2007/0198517 A1 * | 8/2007 | Bresch | ................ | G06F 17/3056 |
| 2008/0228802 A1 * | 9/2008 | Marshall | ........... | G06F 17/30339 |

(Continued)

OTHER PUBLICATIONS

Jantti et al., "The Complete IMS HALDB Guide", IBM Corporation, Jun. 2003, 53 pages.

(Continued)

*Primary Examiner* — Tyler Torgrimson
(74) *Attorney, Agent, or Firm* — Brake Hughes Bellermann LLP

(57) ABSTRACT

Methods and systems enable a database reorganization to occur without a database outage. In one aspect, the method includes pausing transactions directed to the database, keeping a logical view of the database online. The method may also include taking individual partitions offline, changing the names of datasets associated with the individual partitions in a database schema, and bringing the partitions online, all while the logical view of the database remains online. The database schema may be changed to reflect the name of datasets associated with a shadow copy of the database that has been reorganized.

21 Claims, 3 Drawing Sheets

(56) References Cited

U.S. PATENT DOCUMENTS

| | | | | |
|---|---|---|---|---|
| 2010/0088281 A1* | 4/2010 | Driesen | ............... | G06F 8/65 707/641 |
| 2011/0295805 A1* | 12/2011 | Erofeev | ............ | G06F 11/1435 707/634 |
| 2012/0166493 A1* | 6/2012 | Bentzien | ............... | G06F 17/303 707/803 |
| 2012/0179728 A1 | 7/2012 | Harris | | |

OTHER PUBLICATIONS

Data Set (IBM Mainframe), available at https://en.wikipedia.org/wiki/Data_set_(IBM_mainframe), Feb. 2016, 3 pages.

Data Set Names, IBM Corporation, available at https://www.ibm.com/support/knowledgecenter/SSLTBW_2.1.01com.ibm.zos.v2r1.idad400/name.htm, 1990, 2 pages.

* cited by examiner

ZERO-OUTAGE DATABASE REORGANIZATION

TECHNICAL FIELD

The subject matter of the present disclosure relates to systems and methods related to reorganizing databases and, more specifically, to accomplishing such actions for IMS™ databases without a database outage visible to users.

BACKGROUND

A database is an organized collection of data. Databases commonly organize the data into segments, records, and data set groups. In some instances, database data may be divided into partitions. The IBM IMS™ High Availability Large Database (HALDB) is an example of a partitioned database. A partitioned database may store the data of each partition in a number of different data sets. Similarly, a non-partitioned database may store data in a number of data sets. To access the data in such a database, the database may access a specific data set. The names of these data sets may be stored in a database schema and/or catalog file. The database schema generally describes the organization of the database, and may include the size and name of the data sets storing the data of the database, the partition associated with each of the data sets, relationships between partitions, etc. The schema may itself be a data set or some other repository of data that can be modified.

A database administrator may desire to reorganize one or more partitions in a database for various reasons. Database reorganization includes changing some aspect of the data in the database. For example, reorganization may include rearranging the data to improve system performance. Reorganization can include restructuring operations. For example, reorganization of a database may include restructuring operations such as changing the limit keys for partitions, moving data between partitions, changing segment lengths, changing the data access method, changing the parameters that determine where to add new data, etc. For the purposes of this disclosure, most physical changes to the database, such as changing key lengths, may not be considered reorganizing, with the exception of adding segments to the end of the database.

Database reorganization typically requires the database to be taken offline for some amount of time. For example, reorganizing a database may include creating a shadow, or copy, of the data, reorganizing the shadow, taking the database offline, and swapping the data sets of the database with the data sets of the shadow. This swapping generally occurs by renaming the database data sets to a new name and then renaming the shadow data sets to the former names of the database data sets. In such a swap, the database is taken offline so that the names of the data sets can be changed in the operating system catalog files. Renaming a data set requires exclusive accesses to the catalog file, which means applications, such as the database environment, cannot be online and using files during the rename. Furthermore, renaming generally occurs serially, so that other programs may interrupt a rename operation for multiple files, further contributing to the length of the database outage.

But databases have grown and may now have 10,000 data sets. Renaming hundreds or even thousands of data sets may take minutes rather than seconds because the names must be changed serially, one after the other. For businesses such as banking and other financial institutions, Internet retailers, and the travel industry, for example, such outages can have undesirable consequences, causing loss of customers, sales, and opportunities.

SUMMARY

In one general aspect, a computer-implemented method for reorganizing a database with one or more partitions may include creating a shadow of the database, the shadow having at least a partition associated with one or more first data sets and taking a particular partition of the one or more partitions offline while a logical view of the database remains online, the particular partition being associated with one or more second data sets. The method may also include replacing names of the second data sets in a schema of the database with names of the first data sets while the logical view remains online and bringing the particular partition online.

Implementations can include one or more of the following features. For example, taking the particular partition offline and replacing the names of the second data sets may be accomplished without causing transactions directed to the database to abend. As another example the method may further include delaying transactions directed to the database to allow the logical view to remain online. In some implementations the method may include quiescing the logical view of the database to allow the logical view to remain online and terminating the quiesce after restarting the particular partition. In some implementations the database is a HALDB database and the shadow of the database is a restructured copy of the database or a reorganized copy of the database.

In another general aspect, a computer system for reorganizing a database with a plurality of partitions includes at least one processor, a memory storing instructions executable by the at least one processor, a partitioned database having one or more partitions, each partition being associated with one or more data sets, a database schema identifying the data sets associated with each partition, and a zero-outage reorganizer. The zero-outage reorganizer may be configured to create a shadow of the database, the shadow having at least a partition associated with one or more first data sets and may take at least one partition of the partitions offline while a logical view of the database remains online, the at least one partition being associated with one or more second data sets. The zero-outage reorganizer may also be configured to replace names of the second data sets in the schema with names of the first data sets while the logical view remains online and bring the at least one partition online.

Implementations can include one or more of the following features. For example, a transaction directed to the database while the partition is offline may complete successfully after the partition is brought online. The transaction may access records stored in the at least one partition.

In another aspect, a method for reorganizing a database includes creating a shadow of a database, the shadow being a reorganized copy of the database and being associated with one or more first data sets and quiescing the database. The method also includes changing, in a schema for the database, names of second datasets associated with the database to names of the first data sets, activating the schema, and terminating the quiesce operation. In some implementations a transaction directed to the database during the quiesce may complete successfully after the quiesce operation is terminated. The database may be an IMS non-HALDB database.

In another general aspect, a computer program product being tangibly embodied on a computer-readable storage device can be configured to store instructions that, when executed, cause a computing system to perform any of the disclosed methods.

The details of one or more implementations are set forth in the accompanying drawings and the description below. Other features will be apparent from the description and drawings, and from the claims.

DETAILED DESCRIPTION

The systems and methods described herein can be used to reorganize a large database without causing database unavailability. Specifically, disclosed implementations include systems and methods that create a shadow copy of the database and perform the reorganization on the shadow. When the reorganization is complete, disclosed implementations may pause, or quiesce, transactions directed to the database, create a point of consistency between the database and its shadow, and update a database schema to use the data sets that comprise the shadow. When the schema has been updated and activated, disclosed implementations may unpause the transactions. Because no data sets are renamed, the entire database does not need to be taken offline and the system does not need to acquire exclusive access to any system files. Furthermore, updating the schema is fast, so the quiesce operation is relatively short and users of applications accessing the database may not perceive the pause, or may only notice a slight delay. Moreover, because transactions directed to the database during the pause do not terminate abnormally, no data is lost and no transactions need be rescheduled.

Figure 1:
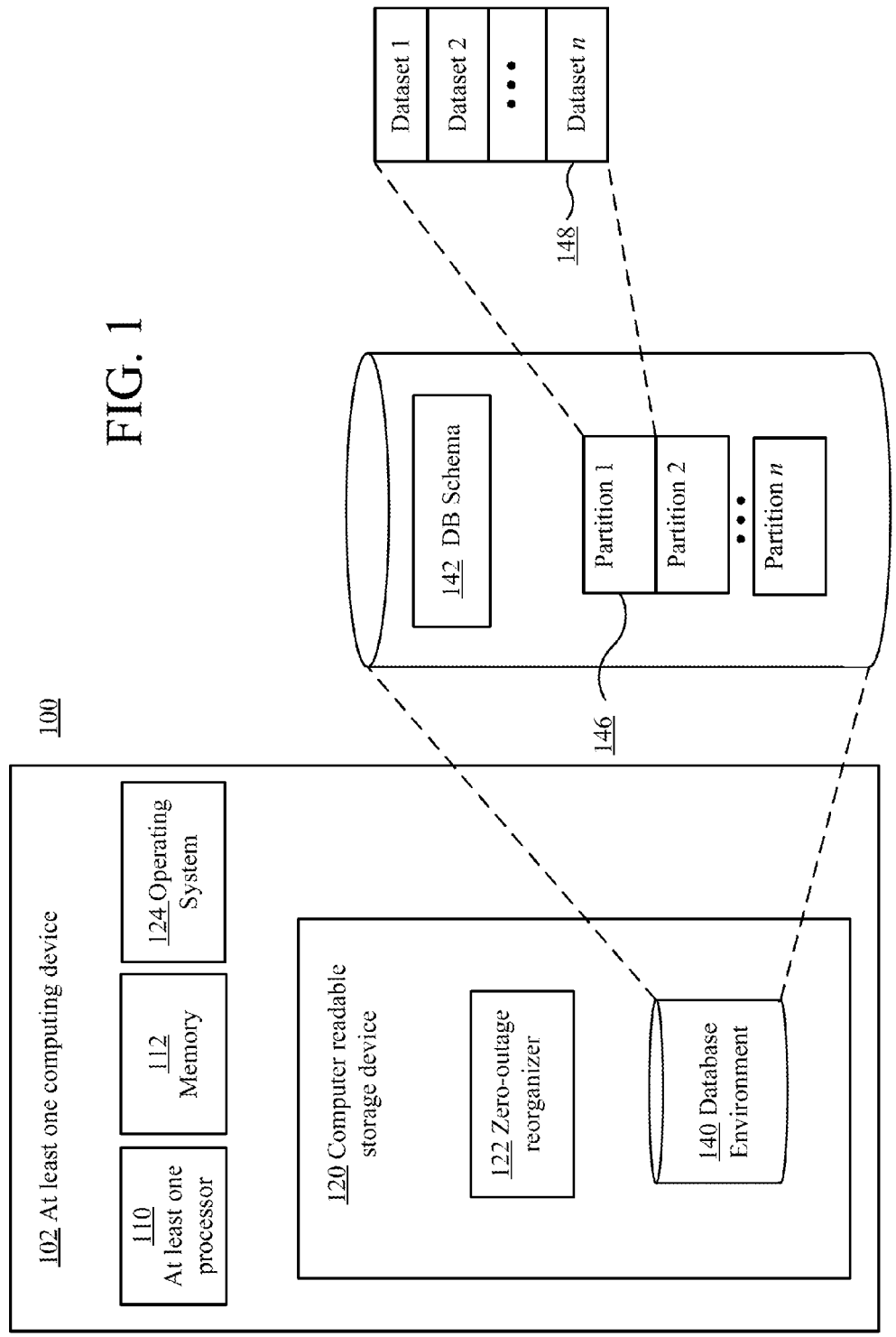
FIG. 1 is a block diagram that illustrates a computing system for reorganizing a partitioned database, according to an implementation.

FIG. 1 is a schematic diagram that illustrates a zero-outage reorganization system 100 for accomplishing a reorganization of a database without taking the database offline. The zero-outage reorganization system 100 can be embodied, for example, on one or more computing devices 102. The zero-outage reorganization system 100 can be, for example, a server that includes one or more computing devices 102. In some implementations, two or more computing devices 102 may be remotely located from each other but in communication with each other via a communications network (not shown). Network data can flow through a variety of mechanisms: communication software and hardware, telephone wires, broadband cable, wireless and microwave transmission units, satellite, fiber optics, and so on. The network can include one or more segments and/or can have portions based on various protocols such as Internet Protocol (IP) and/or a proprietary protocol (Systems Network Architecture—SNA). The network can include at least a portion of the Internet. In some implementations, the network can include multiple computing devices and/or multiple server devices.

The computing device 102 can include one or more processors 110 configured to execute one or more machine executable instructions or pieces of software, firmware, or a combination thereof. The computing device 102 can include one or more computer memories 112, such as a main memory, configured to store data, either temporarily, permanently, semi-permanently, or a combination thereof. The memory 112 may include volatile memory, non-volatile memory, or a combination thereof. The computing device 102 can also include one or more storage mediums 120, such as a non-transitory computer-readable storage disk configured to store data in a semi-permanent or substantially permanent form. Computing device 102 may also include an operating system 124, such as the z/OS® operating system from International Business Machines (IBM). The operating system 124 may contain one or more file allocation tables, such as z/OS® catalog files, that track information related to datasets and other files used on computing device 102.

In some implementations, the computing device 102 may include one or more other hardware components not shown in FIG. 1, such as for example, a display or monitor, a keyboard, a touchscreen, a camera, a mouse, a touchpad, a trackpad, a video processor, etc., through which a user, such as a database administrator, may send data to and receive data from computing device 102. In some implementations, the user may use a second computing device (not shown) in communication with computing device 102 via a communications network, such as the network described above, to send data to and receive data from computing device 102.

The zero-outage reorganization system 100 also includes a database 140 stored in one or more of storage mediums 120 (e.g., disk, cache, main memory) of the computing device 102. The database 140 can be any database storing any type of data. In some implementations, the database 140 is an IMS™ High Availability Large Database (HALDB) database or a non-HALDB IMS™ database from IBM. Database 140 may also be another type of IMS or other database, so long as the database includes a schema file that includes the data set names used to store the data of the database. Database 140 may contain up to 1,001 partitions, and each partition may be comprised of one or more datasets 148. For example, the data stored in each partition 146 may be physically stored in datasets 148 associated with partition 146.

Database 140 may also include a database schema 142. Database schema 142 may store information regarding the organization of the database 140, such as the high-key value, data set name, etc. As part of the organization information, database schema 142 may also store an indication of the data sets associated with the database. For example, database schema 142 may store the names of the data sets. In some implementations, such as a HALDB, the database schema may include data set names for each partition of each database. As discussed above, each partition may have many data sets associated with it, and each database may have hundreds of associated partitions. The database schema 142 of computing system 102 may be stored in a manner that allows record-level access for updates to the schema. For example, in a HALDB, the schema may be stored in the IMS RECON repository and in other IMS databases the schema may be stored in the IMS Catalog.

Storage medium 120 may also store a zero-outage reorganizer 122. Zero-outage reorganizer 122 may include instructions that, when executed by the one or more of processors 110, cause computing device 102 to perform certain functions. For example, zero-outage reorganizer 122 may include instructions to, among other things, quiesce database 140 or a portion of database 140, update database schema 142, make the updated schema active, and terminate the quiesce operation. Zero-outage reorganizer 122 may be a single module or a combination of modules. Storage medium 120 may also contain other modules and instructions.

Figure 2:
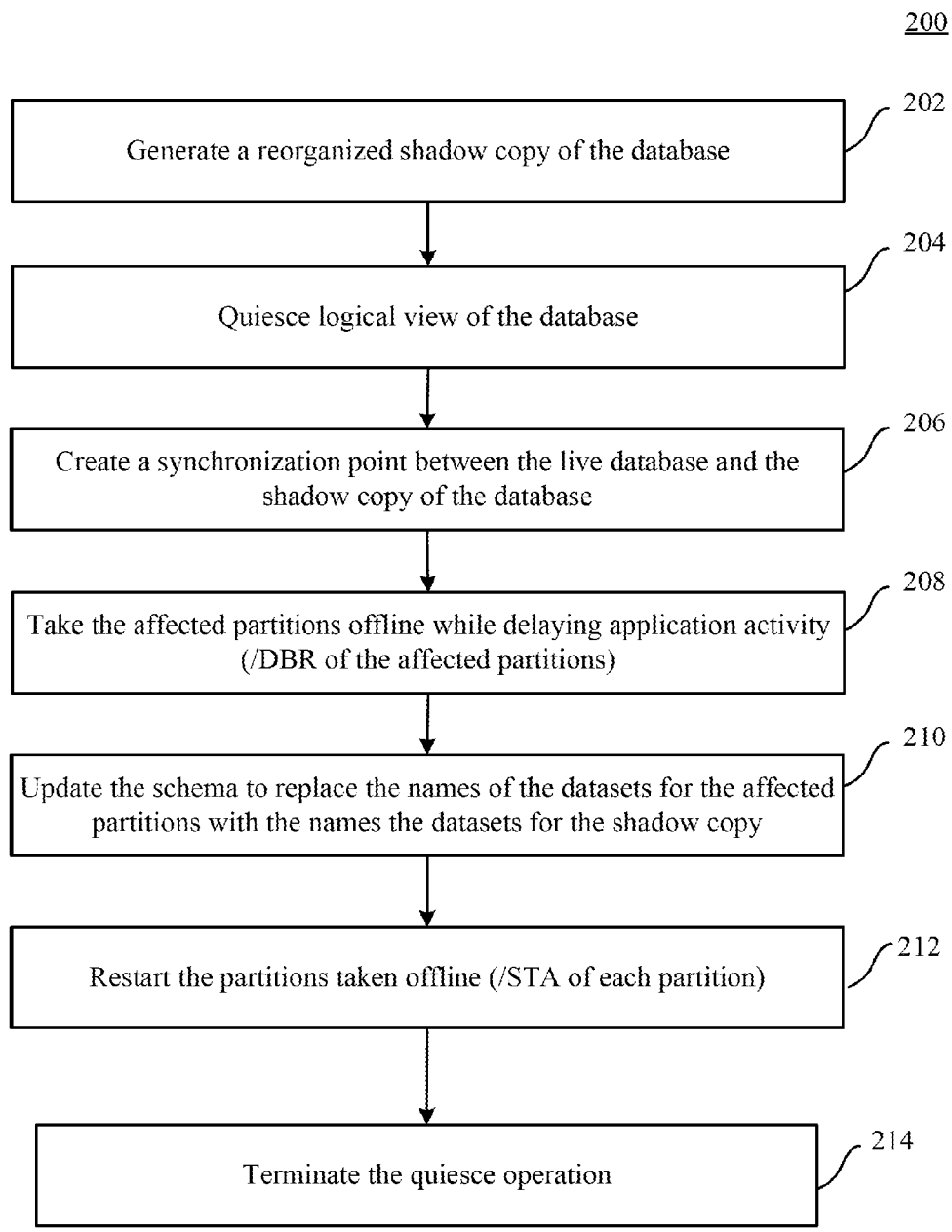
FIG. 2 is a flowchart illustrating a process for reorganizing a partitioned database, according to an implementation.

FIG. 2 is a flowchart of a method 200 for reorganizing a partitioned database. Process 200 may allow a database administrator to perform a database reorganization without affecting the applications accessing the database. A database reorganization may include restructuring the database. Process 200 may work on a database with partitions, such as an IMS HALDB database. Such partitioned databases may support a logical view and a physical view of the database. A logical view may include all partitions, while a physical view may be only a single partition. An application accessing the database uses the logical view because the application does not know ahead of time which partitions it may need to access. In some implementations, process 200 may be performed by, for example, zero-outage reorganizer 122 of zero-outage reorganization system 100.

At 202, zero-outage reorganizer 122 may generate a shadow copy of the database. The shadow copy may be a copy of the database with the same data that is currently in the database, but with the desired reorganization or reformatting. At some point in time the shadow copy may be close enough to the original to pause, or quiesce, the application activity against the database (204). Pausing application activity may delay a response to a transaction requested by the application, but will not cause the transaction to fail. An example of such a quiesce operation is described in U.S. Pat. No. 8,171,005 to Mansur et al., the disclosure of which is incorporated herein by reference. The zero-outage reorganizer 122 may perform the quiesce at the logical level of the database so that transactions directed to any partition are paused, rather than causing the transaction to terminate abnormally, or abend.

Pausing the activity against the database allows the zero-outage reorganizer 122 to create a synchronization point between the online database and the copy of the database (206). A synchronization point may be a point where no incomplete transactions exist and all updates to the online database have also been made to the shadow. This ensures that swapping the shadow for the online database will not result in loss of data. For a database with multiple partitions, zero-outage reorganizer 122 may take one or more affected partitions offline (208). For example, in a HALDB database, a /DBR command may be performed for the reorganized partitions, e.g., using the physical view, rather than the entire master database, e.g., the logical view. For example, in a HALDB database, the zero-outage reorganizer 122 may /DBR all partitions being reorganized. Taking the partitions offline at the physical view while pausing the database at the logical view allows zero-outage reorganizer 122 to update the schema while the database continues to appear to be available.

With the partitions taken offline, the zero-outage reorganizer 122 may obtain a record-level lock on the database schema records for the affected partitions. Thus, zero-outage reorganizer 122 may access the schema records for the partitions and replace the names of the current datasets for the partitions with the names of the datasets for the shadow (210). Updating the dataset names in the schema need not be performed serially, so the update can be accomplished quite quickly, especially when compared to the time required to rename datasets. As described above, renaming datasets requires an exclusive lock on the entire operating system file allocation table, such as the z/OS catalog file. With the schema updated with the names of datasets for the shadow, zero-outage reorganizer 122 may restart the partitions that were taken offline (212). The restart may cause the new schema to be loaded and, therefore, causes the new datasets for the shadow to be allocated to the online environment and opened. For example, in a HALDB database, a /STA command may be used to start each of the partitions and activate the updated schema.

When all affected partitions have been taken offline and the schema updated and the partitions put back online (e.g., /STA for each partition), zero-outage reorganizer 122 may terminate the quiesce operation (214) and allow pending transactions to continue. The pending transactions may then access the reorganized version of the database. Because of the quiesce in process 200, applications continue running without an abnormal termination, so no rescheduling of lost work occurs because no work was lost. In addition, because no data set renames were performed, no operating system files, such as the z/OS catalogs, are modified, further reducing the length of the quiesce operation.

Figure 3:
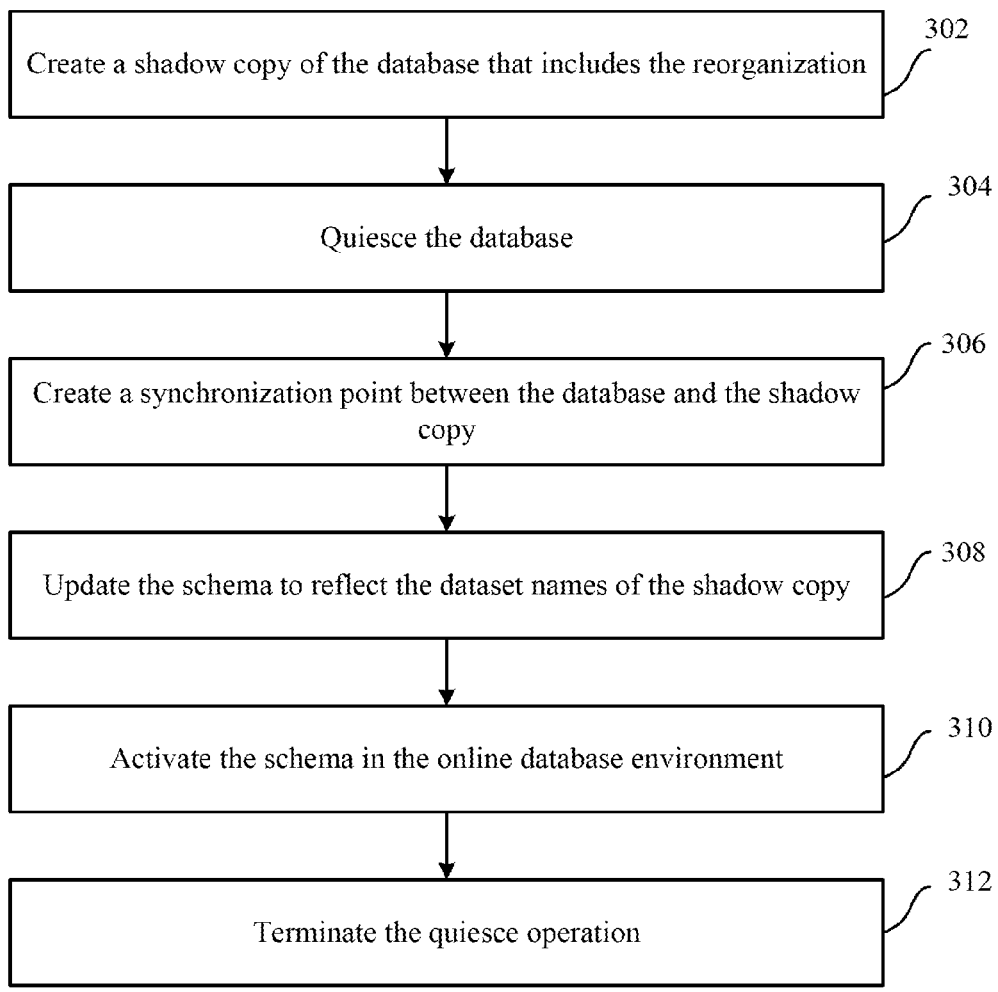
FIG. 3 is a flowchart illustrating another process for reorganizing a database, according to an implementation.

FIG. 3 is a flowchart of a method 300 for reorganizing a non-partitioned database, such as a non-HALDB IMS database. Like process 200, process 300 may allow a database administrator to perform a database reorganization without affecting the applications accessing the database, but process 300 may work on a database without partitions. In some implementations, process 300 may be performed by, for example, zero-outage reorganizer 122 of system 100.

At 302, zero-outage reorganizer 122 may generate a reorganized shadow copy of the database, as described above with regard to step 202 of FIG. 2. Zero-outage reorganizer 122 may also quiesce the database to pause any transactions against the database that have not already completed (304) and create a synchronization point (306), as described above with regard to steps 204 and 206 of FIG. 2. Zero-outage reorganizer 122 may then update the schema with the names of the data sets for the shadow copy of the database (306). For example, the zero-outage reorganizer 122 may update the schema in an IMS catalog file while the database is quiesced. After changing the names of the data sets, zero-outage reorganizer 122 may activate the schema in the online database environment (310). In some implementations, zero-outage reorganizer 122 may take the database offline and bring the database back online to activate the schema. In some implementations the zero-outage reorganizer 122 may take the database offline prior to updating the schema and may bring the database online to activate the updated schema. Once the new schema has been activated, zero-outage reorganizer 122 may terminate the quiesce operation (312), allowing the paused transactions to run using the newly activated schema. Thus, process 300 allows a database administrator to perform reorganization or restructuring of an IMS database without losing any transactions or causing any transactions to abend.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include connections based on various protocols such as Internet Protocol (IP) and/or a proprietary protocol (Systems Network Architecture—SNA).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method of reorganizing a database with one or more partitions, the method comprising:
    creating a shadow of the database, the shadow having at least a partition associated with one or more first data sets;
    taking a particular partition of the one or more partitions of the database offline while a logical view of the database remains online, the particular partition being associated with one or more second data sets;
    while the particular partition remains offline and the logical view remains online, updating a schema of the database by replacing names of the second data sets with names of the first data sets; and
    bringing the particular partition online.

2. The computer-implemented method of claim 1, wherein the database is a High Availability Large Database.

3. The computer-implemented method of claim 1, wherein taking the particular partition offline and replacing the names of the second data sets is accomplished without obtaining exclusive access to an operating system file.

4. The computer-implemented method of claim 1, further comprising restarting the particular partition prior to bringing the particular partition online.

5. The computer-implemented method of claim 1, further comprising quiescing the logical view of the database to allow the logical view to remain online.

6. The computer-implemented method of claim 5, further comprising terminating the quiesce after bringing the particular partition online.

7. The computer-implemented method of claim 1, wherein the shadow of the database is a restructured copy of the database.

8. The computer-implemented method of claim 1, wherein the shadow of the database is a reorganized copy of the database.

9. A non-transitory computer program product being tangibly embodied on a computer-readable storage device storing instructions that, when executed, cause at least one processor to perform the method of claim 1.

10. A computer system for reorganizing a database with a plurality of partitions, the system comprising:
    at least one processor;
    a memory storing instructions executable by the at least one processor;
    a partitioned database having one or more partitions, each partition being associated with one or more data sets;
    a database schema identifying the data sets associated with each partition; and
    a zero-outage reorganizer configured to:
        create a shadow of the database, the shadow having at least a partition associated with one or more first data sets;
        take at least one partition of the one or more partitions of the database offline while a logical view of the database remains online, the at least one partition being associated with one or more second data sets;

while the at least one partition remains offline and the logical view remains online, update the schema by replacing names of the second data sets with names of the first data sets; and bring the at least one partition online.

11. The computer system of claim 10, wherein the database is a High Availability Large Database.

12. The computer system of claim 10, wherein taking the at least one partition offline and replacing the names of the second data sets is accomplished without causing transactions directed to the database to abend.

13. The computer system of claim 10, wherein the zero-outage reorganizer is further configured to restart the at least one partition prior to bringing the at least one partition online.

14. The computer system of claim 10, wherein the zero-outage reorganizer is further configured to quiesce the logical view of the database to allow the logical view to remain online.

15. The computer system of claim 14, wherein the zero-outage reorganizer is further configured to terminate the quiesce after restarting the at least one partition.

16. The computer system of claim 10, wherein the shadow of the database is a reorganized copy of the database.

17. The computer system of claim 10, wherein a transaction directed to the database while the partition is offline completes successfully after the partition is brought online.

18. The computer system of claim 17, wherein the transaction accesses records stored in the at least one partition.

19. A non-transitory computer program product being tangibly embodied on a computer-readable storage device storing instructions that, when executed, cause at least one processor to perform a process, the instructions comprising instructions to:

create a shadow of a database, the shadow being a reorganized copy of the database and being associated with one or more first data sets;

quiesce the database;

obtain a record-level lock of a record in a schema for the database;

change, in the record of the schema for the database, names of second datasets associated with the database to names of the first data sets;

activate the schema; and terminate the quiesce operation.

20. The computer program product of claim 19, wherein the changing occurs without obtaining a lock on an operating system file.

21. The computer program product of claim 19, wherein the database is an IMS database that is a non-High Availability Large Database.

* * * * *

UNITED STATES PATENT AND TRADEMARK OFFICE
CERTIFICATE OF CORRECTION

PATENT NO. : 9,547,672 B2
APPLICATION NO. : 13/625257
DATED : January 17, 2017
INVENTOR(S) : Mansur et al.

It is certified that error appears in the above-identified patent and that said Letters Patent is hereby corrected as shown below:

On the Title Page

On Page 2, Column 1, item (56), under "OTHER PUBLICATIONS", Line 4, delete "2.1.01" and insert --2.1.0/--, therefor.

Signed and Sealed this
Fourteenth Day of March, 2017

Michelle K. Lee
*Director of the United States Patent and Trademark Office*